United States Patent
Al-Regib et al.

(10) Patent No.: US 9,995,390 B2
(45) Date of Patent: Jun. 12, 2018

(54) BRAKE MECHANISM FOR HYBRID VEHICLE ENGINE

(71) Applicant: Ford Global Technologies, LLC, Dearborn, MI (US)

(72) Inventors: Emad Al-Regib, Westland, MI (US); Ronald Gaw, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/342,194

(22) Filed: Nov. 3, 2016

(65) Prior Publication Data

US 2018/0119815 A1    May 3, 2018

(51) Int. Cl.
| | |
|---|---|
| *F16H 63/34* | (2006.01) |
| *B60T 1/00* | (2006.01) |
| *B60K 6/387* | (2007.10) |
| *B60W 20/40* | (2016.01) |
| *B60K 6/38* | (2007.10) |

(52) U.S. Cl.
CPC ............ *F16H 63/34* (2013.01); *B60K 6/387* (2013.01); *B60T 1/005* (2013.01); *B60W 20/40* (2013.01); *B60K 2006/381* (2013.01); *B60Y 2200/92* (2013.01); *B60Y 2400/42* (2013.01); *Y10S 903/914* (2013.01); *Y10S 903/947* (2013.01)

(58) Field of Classification Search
None
See application file for complete search history.

(56) References Cited

U.S. PATENT DOCUMENTS

| | | | |
|---|---|---|---|
| 3,726,372 A | | 4/1973 | Baer et al. |
| 4,576,261 A | * | 3/1986 | Barr ........................ B60T 1/005 |
| | | | 192/219.5 |
| 6,279,713 B1 | * | 8/2001 | Young ..................... B60T 1/005 |
| | | | 188/31 |
| 6,553,287 B1 | | 4/2003 | Supina et al. |
| 7,850,255 B2 | | 12/2010 | Kawahara et al. |
| 8,317,648 B2 | | 11/2012 | Robinette et al. |
| 8,425,377 B2 | | 4/2013 | Liang et al. |
| 2014/0216885 A1 | * | 8/2014 | Heuver .................. B60T 1/005 |
| | | | 192/219.4 |
| 2014/0231212 A1 | * | 8/2014 | Kayukawa ................ B60T 1/06 |
| | | | 192/219.4 |

(Continued)

*Primary Examiner* — Justin Holmes
(74) *Attorney, Agent, or Firm* — David B. Kelley; Brooks Kushman P.C.

(57) ABSTRACT

A hybrid vehicle powertrain assembly includes a combustion engine, an electric machine, an input shaft, a ratchet mechanism, and a controller. The input shaft selectively couples the engine and electric machine. The ratchet mechanism includes a base integrated with a transmission housing, a camwheel fixedly coupled to the input shaft, a pawl, and an actuator to move the pawl. The controller is programmed to, in response to receipt of an engine brake command, output an engagement command to the actuator to move the pawl toward the camwheel for engagement to prevent the input shaft from spinning. A method for controlling a hybrid vehicle powertrain is also provided herein. The method includes, responsive to receipt of an engine brake command, outputting via a controller a command for a ratchet mechanism to engage an input shaft coupled to an engine to prevent the input shaft from spinning.

18 Claims, 5 Drawing Sheets

(56) References Cited

U.S. PATENT DOCUMENTS

| | | | |
|---|---|---|---|
| 2014/0257643 A1 | 9/2014 | Dufford et al. | |
| 2015/0167808 A1* | 6/2015 | Kim | B60K 6/365 |
| | | | 475/5 |
| 2015/0204391 A1* | 7/2015 | Kimes | F16D 27/09 |
| | | | 192/84.8 |
| 2016/0272195 A1* | 9/2016 | Hirasawa | B60W 20/50 |
| 2016/0290417 A1* | 10/2016 | Brubaker | F16D 41/125 |
| 2017/0282910 A1* | 10/2017 | Kim | B60W 10/06 |

* cited by examiner

BRAKE MECHANISM FOR HYBRID VEHICLE ENGINE

TECHNICAL FIELD

This disclosure relates to powertrain assemblies for hybrid vehicles.

BACKGROUND

Extended drive range technology for electrified vehicles, such as battery electric vehicles (BEVs) and plug in hybrid vehicles (PHEVs), is continuously improving. Achieving these increased ranges, however, often requires traction batteries, power electronics components, and electric machines to cooperate with one another to maximize power distribution for improving fuel efficiency.

SUMMARY

A powertrain assembly of a hybrid vehicle includes an input shaft for a combustion engine and a ratchet mechanism. The ratchet mechanism includes a pawl, a camwheel fixedly coupled to the input shaft, and an actuator. The ratchet mechanism is arranged with the input shaft to selectively move the actuator to direct movement of the pawl toward the camwheel to prevent rotation of the input shaft for combustion engine braking. A spring may be arranged with the actuator to bias the pawl away from the camwheel to prevent inadvertent engagement of the pawl to the camwheel. The camwheel may be mounted to a carrier face in rotational communication with the input shaft. A solenoid may be mechanical communication with the actuator and in electrical communication with a controller. The controller may be programmed to selectively activate the solenoid to direct movement of the actuator for the pawl to engage or disengage with the camwheel. The solenoid may be mounted between a ratchet mechanism base, a transmission housing, and the pawl. The ratchet mechanism may further include a base integrated with a transmission housing and supporting the ratchet mechanism. The ratchet mechanism may further include a rod arranged with the pawl for vertical translation of the pawl along an axis defined by the rod. The ratchet mechanism may include a base to support the ratchet mechanism mounted to a transmission housing at a location adjacent to the camwheel. The pawl may include an end defining an angled surface and a vertical surface. The camwheel may include teeth shaped such that the vertical surface prevents rotation of the camwheel in a first direction and the angled surface permits rotation of the camwheel in a second direction when the pawl is engaged with the camwheel.

A hybrid vehicle powertrain assembly includes a combustion engine, an electric machine, an input shaft, a ratchet mechanism, and a controller. The input shaft selectively couples the engine and electric machine. The ratchet mechanism includes a base integrated with a transmission housing, a camwheel fixedly coupled to the input shaft, a pawl, and an actuator to move the pawl. The controller is programmed to, in response to receipt of an engine brake command, output an engagement command to the actuator to move the pawl toward the camwheel for engagement to prevent the input shaft from spinning. The ratchet mechanism may further include a spring mounted to bias movement of the pawl away from the camwheel to prevent inadvertent engagement of the pawl to the camwheel. The ratchet mechanism may further include a solenoid in electrical communication with the controller to receive command signals therefrom to activate the actuator to engage or disengage the pawl with the camwheel. The solenoid may be attached to a transmission housing via a bracket. The camwheel may be mounted to a carrier face in rotational communication with the input shaft. The pawl may include an end defining an angled surface and a vertical surface, and the camwheel may include teeth shaped such that the vertical surface prevents rotation of the camwheel in a first direction and the angled surface permits rotation of the camwheel in a second direction when the pawl is engaged with the camwheel.

A method for controlling a hybrid vehicle powertrain includes, responsive to receipt of an engine brake command, outputting via a controller a command for a ratchet mechanism to engage an input shaft coupled to an engine to prevent the input shaft from spinning. The ratchet mechanism may further include a solenoid in electrical communication with the controller, and the method may further include outputting via the controller an engine brake command to the solenoid to engage the ratchet mechanism and input shaft for engine braking. The method may further include, responsive to presence of a gear shifter position in reverse, outputting via the controller the command for the ratchet mechanism to engage the input shaft for engine braking.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
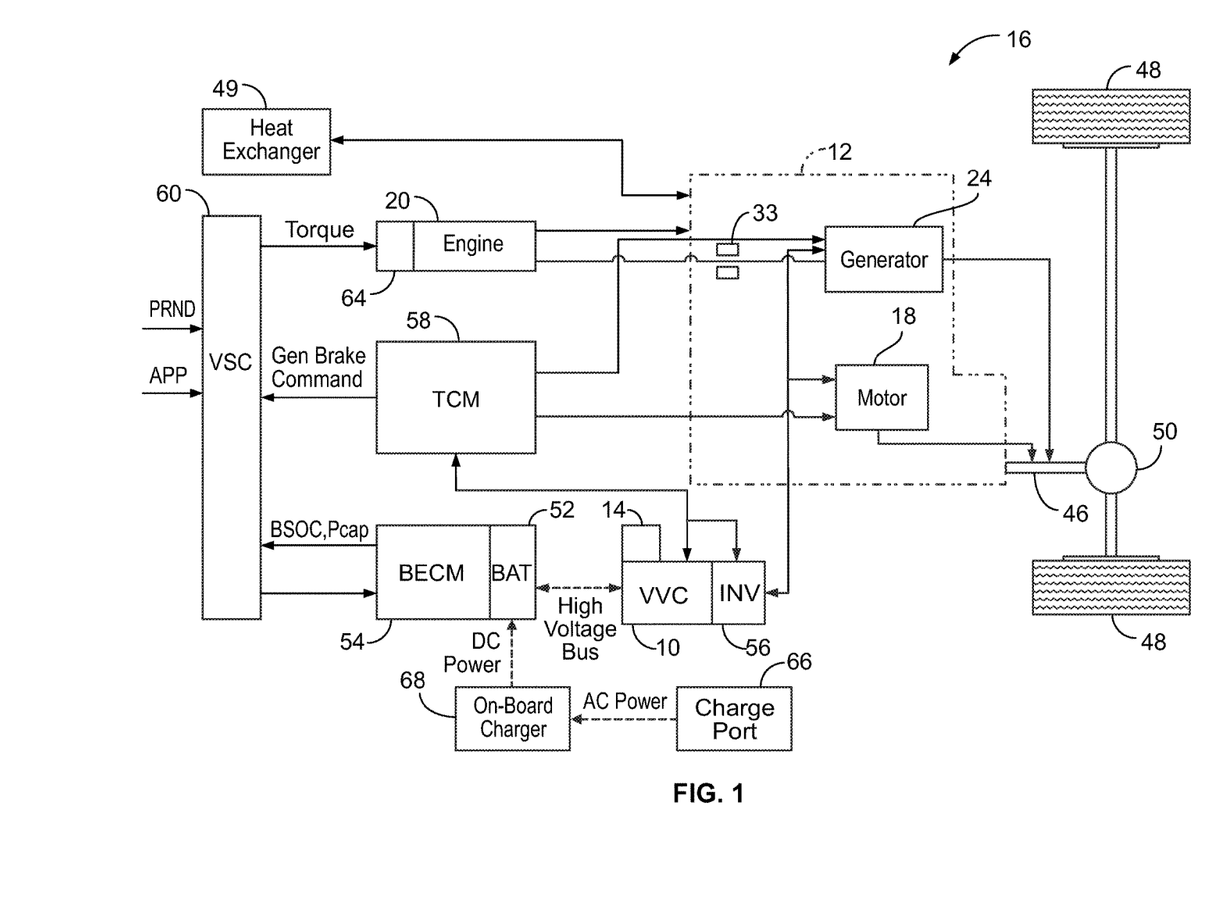
FIG. 1 is a schematic diagram illustrating an example of a vehicle.

An example of a vehicle is depicted in FIG. 1, referred to generally as a vehicle 16 herein. The vehicle 16 may include a transmission 12 and is an example of an electric vehicle propelled by a first electric machine with assistance from an internal combustion engine 20. The vehicle 16 may be connectable to an external power grid. The first electric machine may be an AC electric motor referred to as a motor 18 herein. The motor 18 receives electrical power and provides torque for vehicle propulsion. The motor 18 may also function as a generator for converting mechanical power into electrical power through regenerative braking.

The transmission 12 may be a power-split configuration. The transmission 12 may include the motor 18 and a second electric machine. The second electric machine may be an AC electric motor referred to as a generator 24 herein. Similar to the motor 18, the generator 24 may receive electrical power and provide output torque. The generator 24 may also convert mechanical power into electrical power and optimize power flow through the transmission 12. In other embodiments, the transmission may not have a power-split configuration.

The transmission 12 may include a planetary camwheel unit (not shown) and may operate as a continuously variable transmission and without any fixed or step ratios. The transmission 12 may also include a one-way clutch (O.W.C.) and a generator brake 33. The O.W.C. may be coupled to an output shaft of the engine 20 to control a direction of rotation of the output shaft. The O.W.C. may prevent the transmission 12 from back-driving the engine 20. The generator brake 33 may be coupled to an output shaft of the generator 24. The generator brake 33 may be activated to "brake" or prevent rotation of the output shaft of the generator 24 and of a sun camwheel (not shown). Alternatively, the O.W.C. and the generator brake 33 may be replaced by implementing control strategies for the engine 20 and the generator 24. The transmission 12 may be connected to a driveshaft 46. The driveshaft 46 may be coupled to a pair of drive wheels 48 through a differential 50. An output camwheel (not shown) of the transmission may assist in transferring torque between the transmission 12 and the drive wheels 48. The transmission 12 may also be in communication with a heat exchanger 49 or an automatic transmission fluid cooler (not shown) for cooling the transmission fluid.

The vehicle 16 includes an energy storage device, such as a traction battery 52 for storing electrical energy. The battery 52 may be a high voltage battery capable of outputting electrical power to operate the motor 18 and the generator 24 as further described below. The battery 52 may also receive electrical power from the motor 18 and the generator 24. The battery 52 may be a battery pack made up of several battery modules (not shown), where each battery module contains a plurality of battery cells (not shown). Other embodiments of the vehicle 16 contemplate alternative types of energy storage devices, such as capacitors and fuel cells (not shown) that may supplement or replace the battery 52.

A high voltage bus may electrically connect the battery 52 to the motor 18 and to the generator 24. For example, the vehicle 16 may include a battery energy control module (BECM) 54 for controlling the battery 52. The BECM 54 may receive input indicative of certain vehicle conditions and battery conditions, such as battery temperature, voltage, and current. The BECM 54 may calculate and estimate parameters of the battery 52, such as a battery state of charge (BSOC) and a battery power capability (Pcap). The BECM 54 may provide output that is indicative of the BSOC and Pcap to other vehicle systems and controllers.

The vehicle 16 may include a DC-DC converter or variable voltage converter (VVC) 10 and an inverter 56. The VVC 10 and the inverter 56 may be electrically connected between the battery 52 and the motor 18 and the generator 24. The VVC 10 may "boost" or increase a voltage potential of electrical power provided by the battery 52. The VVC 10 may also "buck" or decrease voltage potential of the electrical power provided to the battery 52. The inverter 56 may invert DC power supplied by the battery 52 via the VVC 10 to AC power for operating each of the motor 18 and the generator 24. The inverter 56 may also rectify AC power provided by each of the motor 18 and the generator 24 for charging the battery 52. In other examples, the transmission 12 may operate with multiple inverters, such as one inverter associated with each of the motor 18 and the generator 24. The VVC 10 includes an inductor assembly 14 (further described in relation to FIG. 2).

The transmission 12 is shown in communication with a transmission control module (TCM) 58 for controlling the motor 18 and the generator 24, the VVC 10, and the inverter 56. The TCM 58 may be configured to monitor conditions of each of the motor 18 and the generator 24 such as position, speed, and power consumption. The TCM 58 may also monitor electrical parameters (e.g., voltage and current) at various locations within the VVC 10 and the inverter 56. The TCM 58 provides output signals corresponding to this information for other vehicle systems to utilize.

The vehicle 16 may include a vehicle system controller (VSC) 60 that communicates with other vehicle systems and controllers for coordinating operations thereof. Although shown as a single controller, it is contemplated that the VSC 60 may include multiple controllers to control multiple vehicle systems and components according to an overall vehicle control logic or software.

The vehicle controllers, such as the VSC 60 and the TCM 58, may include various configurations of microprocessors, ASICs, ICs, memory (e.g., FLASH, ROM, RAM, EPROM and/or EEPROM), and software code to cooperate with one another to perform vehicle operations. The controllers may also include predetermined data, or "look up tables," which are accessible from the memory and may be based on calculations and test data. This predetermined data may be utilized by the controllers to facilitate control of the vehicle operations. The VSC 60 may communicate with other vehicle systems and controllers (e.g., the BECM 54 and the TCM 58) over one or more wired or wireless connections using bus protocols such as CAN and LIN. The VSC 60 may receive input (PRND) that represents a current position of the transmission 12 (e.g., park, reverse, neutral or drive). The VSC 60 may also receive input (APP) that represents an accelerator pedal position. The VSC 60 may provide outputs representative of a desired wheel torque, desired engine speed, and a generator brake command to the TCM 58; and contactor control to the BECM 54.

The vehicle 16 may include an engine control module (ECM) 64 for controlling the engine 20. The VSC 60 provides output, such as desired engine torque, to the ECM 64 that may be based on a number of input signals including APP and may correspond to a driver's request for vehicle propulsion.

The battery 52 may periodically receive AC energy from an external power supply or grid via a charge port 66. The vehicle 16 may also include an on-board charger 68 which receives the AC energy from the charge port 66. The charger 68 may include AC/DC conversion capability to convert the received AC energy into DC energy suitable for charging the battery 52 during a recharge operation. Although illustrated and described in the context of a PHEV, it is contemplated that the inverter 56 may be implemented with other types of electrified vehicles, such as a FHEV or a BEV.

Figure 2:
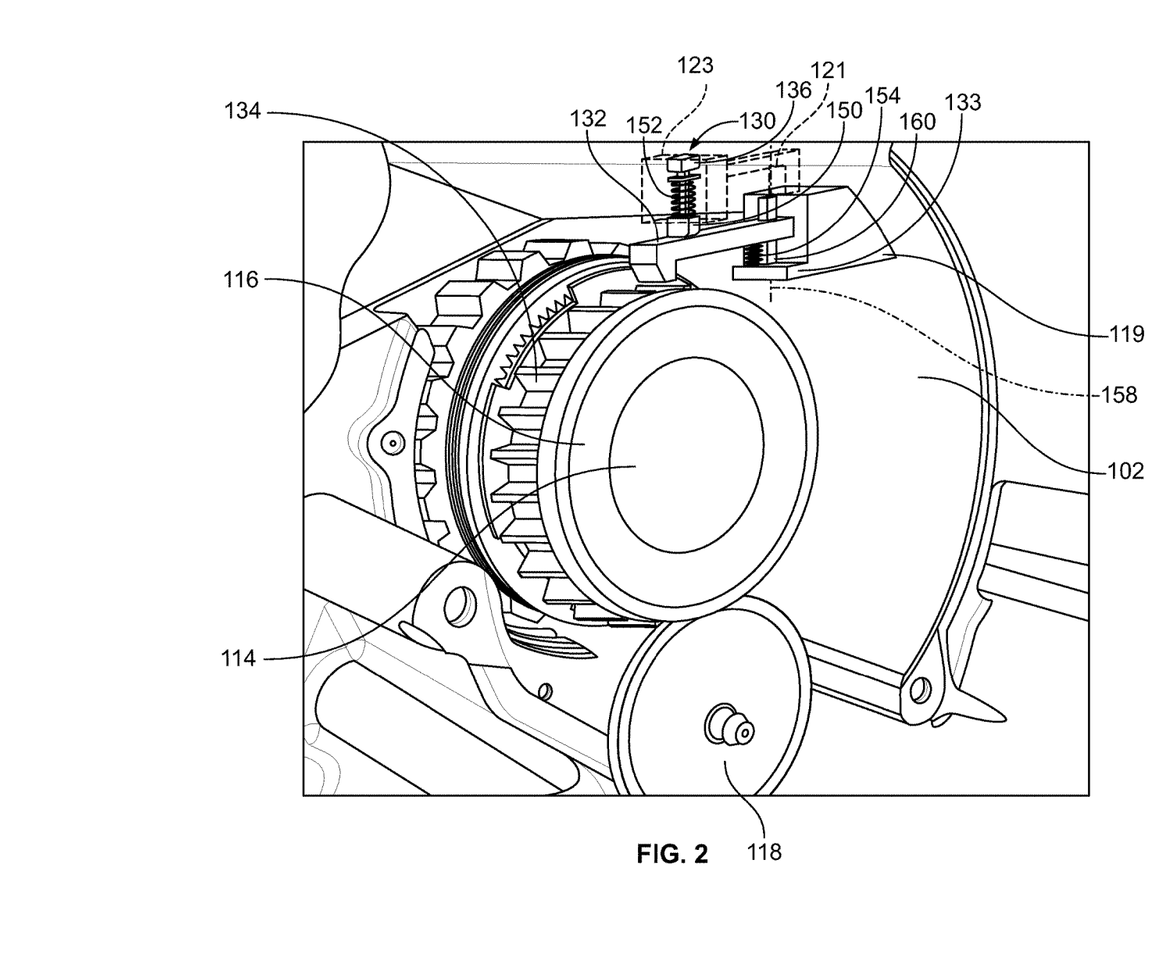
FIG. 2 is a perspective view of an example of a portion of a hybrid vehicle powertrain.
Figure 3:
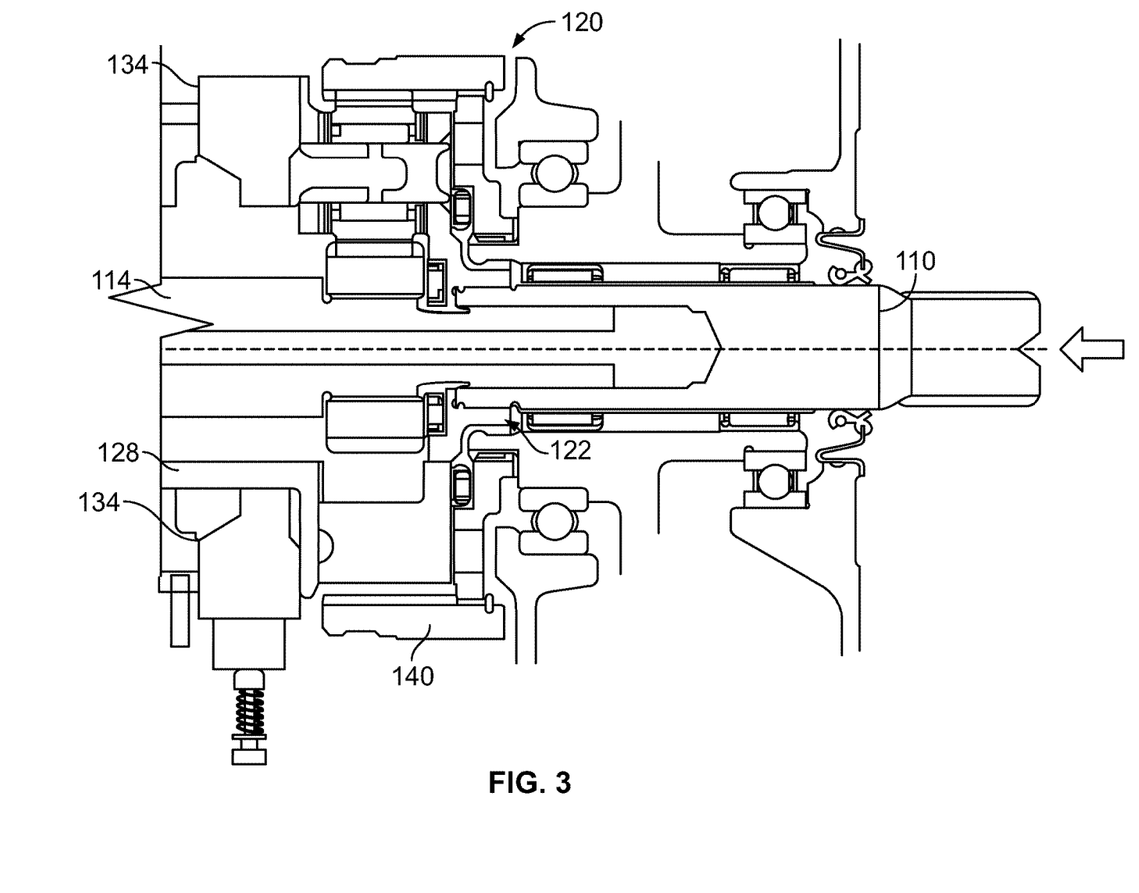
FIG. 3 is a side view, in cross-section, of an example of the portion of the hybrid vehicle powertrain of FIG. 2.

FIGS. 2 and 3 show an example of a portion of a powertrain assembly for a hybrid vehicle. The powertrain assembly may include a transmission housing 102, an input shaft 110 for an ICE (not shown), a generator shaft 114, a sprocket camwheel 116, and a driven camwheel 118. The transmission housing 102 may be sized to retain components of the powertrain assembly therein and may provide a surface for mounting a ratchet mechanism 130. For example, the ratchet mechanism 130 may include a base 119, a pawl 132, a camwheel 134, and a solenoid 136. The base 119 may be mounted to an inner surface of the transmission housing 102 such that the pawl 132 may engage the camwheel 134. For example, the base 119 may be mounted to the transmission housing 102 at a location adjacent to the camwheel 134. The base 119 may include a spring support 133. The base 119 may be formed as a single unit with the transmission housing 102. For example, the other portions of the ratchet mechanism 130 may be mounted to the base 119 during an assembly process. The solenoid 136 may be mounted to the base 119 to interface with the pawl 132. For example, a bracket 121 may extend from the base 119. A housing 123 may be mounted to the bracket 121 and include a portion of the ratchet mechanism 130.

FIG. 3 shows a partial side view, in cross-section, of a portion of the powertrain assembly. The ICE (not shown) is coupled to the input shaft 110. The ICE may be an internal combustion engine, such as the engine 20 in FIG. 1. The carrier face 128 is in rotational communication with the input shaft 110. Rotation is transferred between the input shaft 110 and the generator shaft 114 via a carrier 122, and then between the carrier 122 and the carrier face 128. The camwheel 134 of the ratchet mechanism 130 is fixedly coupled to the input shaft 110 via the carrier 122 and the carrier face 128. The pawl 132 engages the camwheel 134 when the solenoid 136 receives an engine brake command from the controller (not shown). For example, the controller may output an engine brake command in response to presence of certain conditions, such as a detection of a camwheel shifter being in a reverse position. In comparison to usage of an O.W.C., engagement of the ratchet mechanism 130 may operate with a lower drag on the powertrain assembly and result in a higher efficiency of torque transfer. Additionally, the usage of the ratchet mechanism 130 may provide fuel economy advantages in comparison to a system utilizing the O.W.C. Further, the ratchet mechanism 130 may assist in addressing packaging constraints associated with a larger O.W.C.

In this example, the ratchet mechanism 130 is shown adjacent a park camwheel 140. The park camwheel 140 may be part of a park mechanism to assist in preventing movement of the input shaft 110. It is contemplated that other locations are available for the ratchet mechanism 130 based on available package space. For example, the ratchet mechanism 130 may be located between the transmission housing 102 and the camwheel 134.

Figure 4:
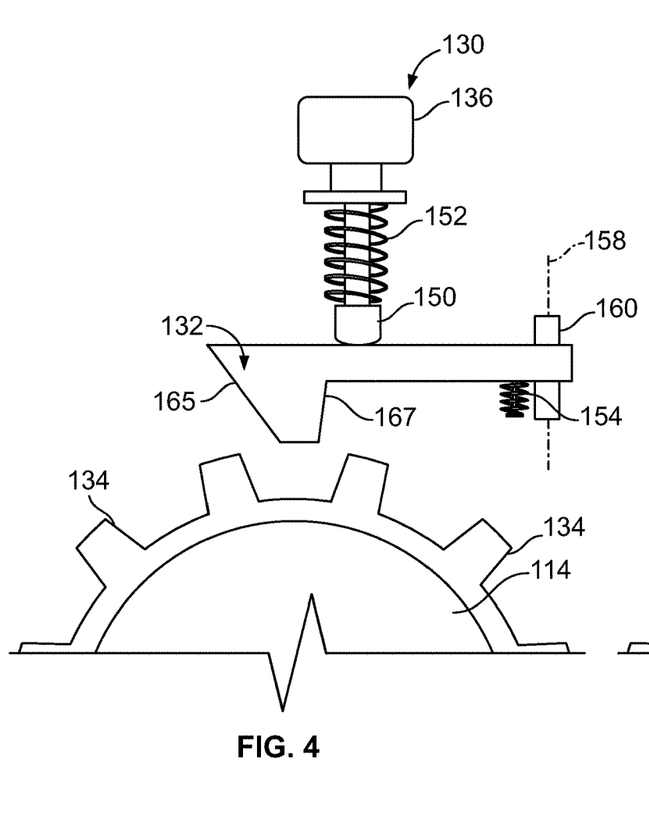
FIG. 4 is a side view of an example of a ratchet mechanism of the hybrid vehicle powertrain shown in a first configuration.
Figure 5:
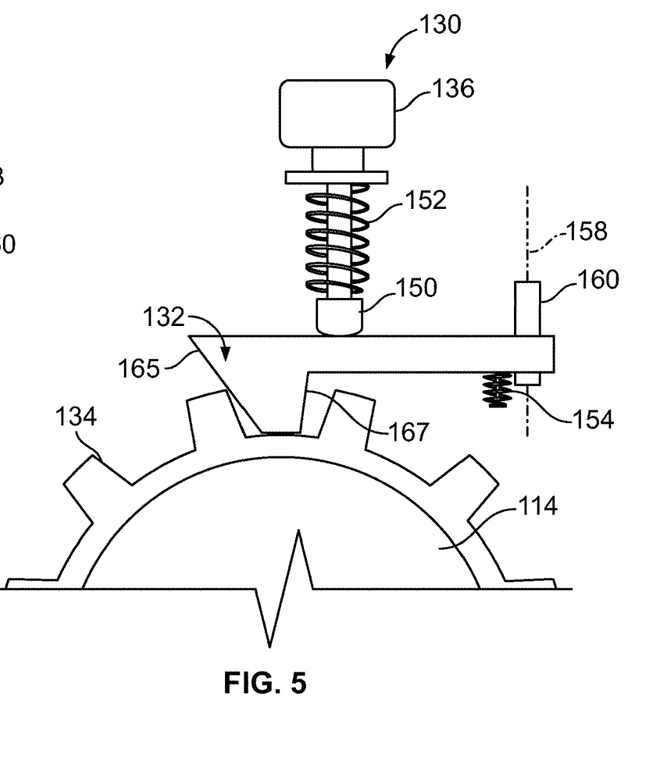
FIG. 5 is a side view of the example the ratchet mechanism of FIG. 4 shown in a second configuration.

FIGS. 4 and 5 show an example of the ratchet mechanism 130. The ratchet mechanism 130 includes the pawl 132, the camwheel 134, an actuator 150, a first spring 152, and a second spring 154. The actuator 150 may be arranged with the pawl 132 to direct translation of the pawl 132 along an axis 158. For example, a rod 160 may be mounted to the base 119 such that the pawl 132 may translate along the axis 158. The first spring 152 and the second spring 154 may be oriented to assist in directing movement of the pawl 132.

For example, the first spring 152 and the second spring 154 may be biased toward one another to retain the pawl 132 in a first configuration as shown in FIG. 4 and to prevent inadvertent engagement of the pawl 132 and the camwheel 134. The solenoid 136 may receive a command from a controller to direct movement of the actuator 150 with assistance of the first spring 152 to engage the pawl 132 with the camwheel 134. The solenoid 136 may receive a command from the controller to direct movement of the actuator 150 for the pawl 132 to disengage with the camwheel 134. The pawl 132 includes an end defining an angled surface 165 and a vertical surface 167. The camwheel 134 includes teeth shaped such that the vertical surface 167 prevents rotation of the camwheel 134 in a first direction and the angled surface 165 permits rotation of the camwheel 134 in a second direction when the pawl 132 is engaged with the camwheel 134.

The input shaft 110 is fixedly coupled to the camwheel 134 as described above. Engaging the pawl 132 with the camwheel 134 prevents rotation of the carrier face 128. The carrier 122 and the input shaft 110 and may increase torque through the output. For example, if a vehicle is in an electric only mode, the engagement of the pawl 132 with the camwheel 134 may operate as an engine brake to prevent movement of the input shaft 110.

Figure 6:
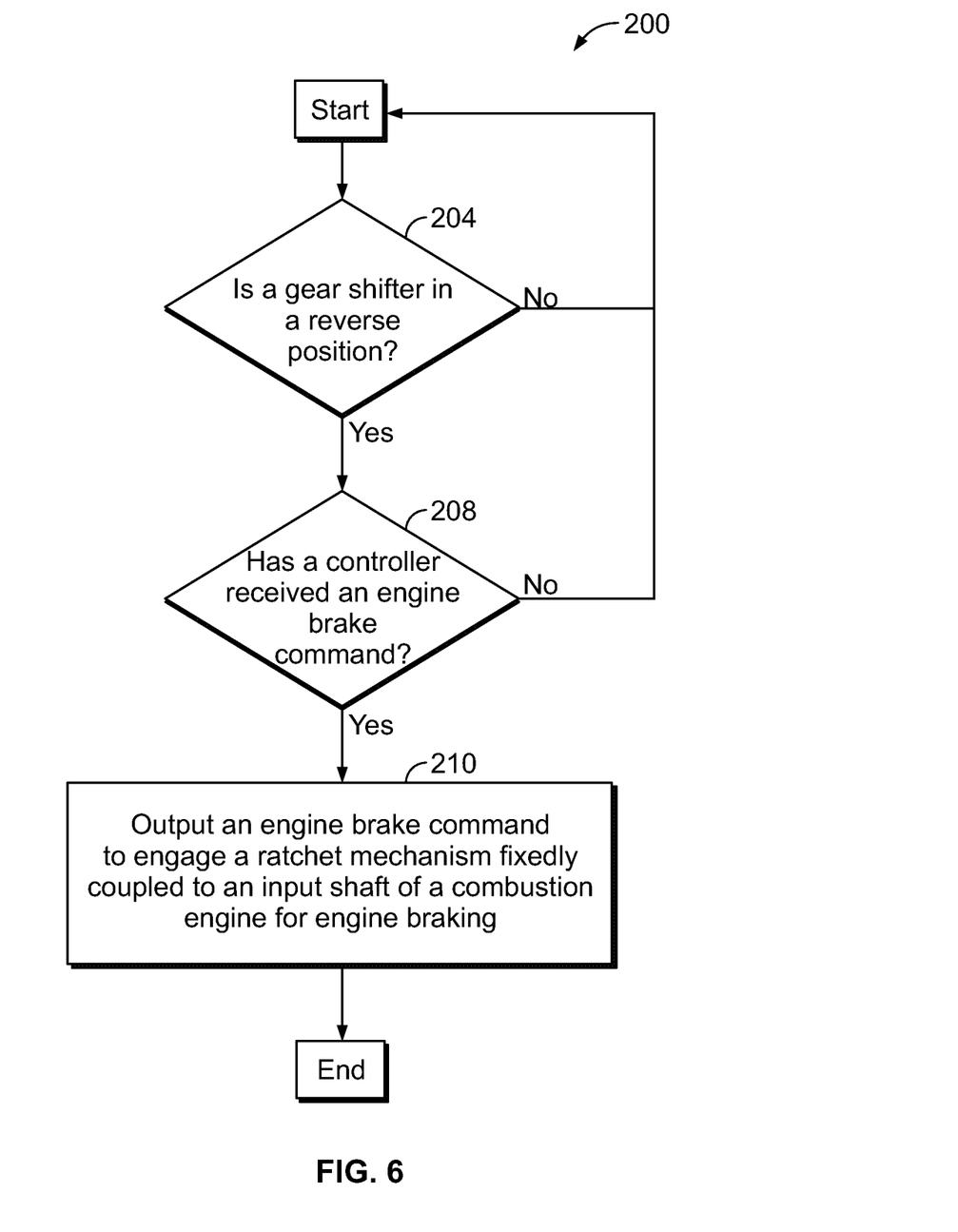
FIG. 6 is a block diagram depicting an example of an algorithm for controlling a hybrid vehicle powertrain.

FIG. 6 shows an example of an algorithm for a control strategy to operate a hybrid vehicle powertrain, referred to generally as an algorithm 200 herein. In operation 204, a controller may detect whether one of a set of conditions has occurred. For example, the controller may detect whether a gear shifter is oriented in a reverse position or whether the hybrid vehicle is operating in electric only mode. In operation 208 the controller may detect where an engine brake command has been received. In the event an engine brake command has been received, in operation 210, the controller may output an engine brake command to engage a pawl and camwheel of a ratchet mechanism, such as the ratchet mechanism 130, to constrain rotation of an engine input shaft. In this example, the camwheel may be fixedly coupled to the engine input shaft. As such, the algorithm 200 may operate to selectively output engine brake commands.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:
1. A hybrid vehicle powertrain assembly comprising:
an engine input shaft; and
a ratchet mechanism including a pawl, a camwheel fixedly coupled to the shaft, a first spring on a first pawl side adjacent a first pawl end, and a second spring on a second pawl side adjacent a second pawl end, and arranged with the shaft to selectively move the pawl to engage the camwheel to prevent shaft rotation for engine braking.

2. The powertrain assembly of claim 1, wherein the first spring and the second spring are arranged with the pawl such that a bias of each spring is toward a respective pawl side.

3. The powertrain assembly of claim 1, wherein the camwheel is mounted to a carrier face in rotational communication with the input shaft.

4. The powertrain assembly of claim 1 further comprising a solenoid in mechanical communication with an actuator and in electrical communication with a controller, wherein the controller is programmed to selectively activate the solenoid to direct movement of the actuator to influence the pawl to engage or disengage with the camwheel.

5. The powertrain assembly of claim 4, wherein the solenoid is mounted between a ratchet mechanism base, a transmission housing, and the pawl.

6. The powertrain assembly of claim 1, wherein the ratchet mechanism further includes a base integrated with a transmission housing and supporting the ratchet mechanism.

7. The powertrain assembly of claim 1, wherein the ratchet mechanism further includes a rod for the pawl to vertically translate thereupon, and wherein the pawl is arranged with the rod such that the entire pawl translates vertically and does not rotate.

8. The powertrain assembly of claim 1, wherein the ratchet mechanism includes a base to support the ratchet mechanism mounted to a transmission housing at a location adjacent to the camwheel.

9. The powertrain assembly of claim 1, wherein the pawl includes an angled surface and a vertical surface at the first pawl end, and wherein the camwheel includes teeth shaped such that the vertical surface prevents rotation of the camwheel in a first direction and the angled surface permits rotation of the camwheel in a second direction when the pawl is engaged with the camwheel.

10. A hybrid vehicle powertrain assembly comprising:
a combustion engine;
an electric machine;
an input shaft to selectively couple the engine and electric machine;
a ratchet mechanism including a base integrated with a transmission housing, a camwheel fixedly coupled to the input shaft, a pawl member, first and second springs, and an actuator to move the pawl member; and
a controller programmed to, responsive to receipt of an engine brake command, output an engagement command to the actuator to move the pawl member toward the camwheel for engagement to prevent the input shaft from spinning,
wherein the first and second springs are arranged on opposing ends and sides of the pawl member with opposing biases to vertically translate the pawl member along an axis defined by a rod of which the pawl member is mounted thereto.

11. The assembly of claim 10, wherein the second spring is mounted to an underside of the pawl member to bias movement of the pawl member away from the camwheel to prevent inadvertent engagement of the pawl member to the camwheel.

12. The assembly of claim 10, wherein the ratchet mechanism further comprises a solenoid in electrical communication with the controller to receive command signals therefrom to activate the actuator to engage or disengage the pawl member with the camwheel.

13. The assembly of claim 12, wherein the solenoid is attached to a transmission housing via a bracket.

14. The assembly of claim 10, wherein the camwheel is mounted to a carrier face in rotational communication with the input shaft.

15. The assembly of claim 10, wherein one of the pawl member's ends defines an angled surface and a vertical surface, and wherein the camwheel includes teeth shaped such that the vertical surface prevents rotation of the camwheel in a first direction and the angled surface permits rotation of the camwheel in a second direction when the pawl member is engaged with the camwheel.

16. A method for controlling a hybrid vehicle powertrain comprising:
responsive to receipt of an engine brake command, outputting via a controller a command for a ratchet mechanism to engage an input shaft coupled to an engine to prevent the input shaft from spinning, wherein the ratchet mechanism includes two springs of opposing bias located on opposing ends and sides of a pawl member to influence vertical translation of the pawl member along an axis defined by a rod supporting the pawl member for translation.

17. The method of claim 16, wherein the ratchet mechanism further comprises a solenoid in electrical communication with the controller, and wherein the method further comprises outputting via the controller an engine brake command to the solenoid to engage the ratchet mechanism and input shaft for engine braking.

18. The method of claim 16 further comprising responsive to presence of a gear shifter position in reverse, outputting via the controller the command for the ratchet mechanism to engage the input shaft for engine braking.

* * * * *